(12) United States Patent
Nandyalam et al.

(10) Patent No.: US 10,037,368 B1
(45) Date of Patent: Jul. 31, 2018

(54) METHODS, SYSTEMS, AND COMPUTER READABLE MEDIUMS FOR PERFORMING A FREE-FORM QUERY

(71) Applicant: VCE Company, LLC, Richardson, TX (US)

(72) Inventors: Rajesh Nandyalam, Whitinsville, MA (US); Geoffrey David Bourne, Allen, TX (US); Joseph Malek, Seattle, WA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 376 days.

(21) Appl. No.: 14/581,228

(22) Filed: Dec. 23, 2014

(51) Int. Cl.
*G06F 17/30* (2006.01)

(52) U.S. Cl.
CPC .. *G06F 17/30569* (2013.01); *G06F 17/30867* (2013.01); *G06F 17/30932* (2013.01)

(58) Field of Classification Search
None
See application file for complete search history.

(56) References Cited

U.S. PATENT DOCUMENTS

| 9,280,535 B2 * | 3/2016 | Varma | G06F 17/30401 |
| 9,489,457 B2 * | 11/2016 | Regan | G06F 9/445 |
| 2012/0254143 A1 * | 10/2012 | Varma | G06F 17/2785 707/706 |
| 2013/0018864 A1 * | 1/2013 | Regan | G06F 17/30864 707/706 |
| 2013/0018867 A1 * | 1/2013 | Regan | G06F 9/445 707/707 |
| 2015/0142704 A1 * | 5/2015 | London | G06N 5/04 706/11 |
| 2016/0004696 A1 * | 1/2016 | Trenkov | G06F 17/2785 707/760 |

OTHER PUBLICATIONS

Titan: Distributed Graph Database, http://thinkaurelius.github.io/titan/, pp. 1-2 (Dec. 17, 2014).
"Graph database," Wikipedia, http://en.wikipedia.org/w/index.php?title=Graph_database&oldid=638548725, pp. 1-10 (Dec. 17, 2014, Downloaded from the Internet Dec. 23, 2014).
"Elasticsearch," Wikipedia, http://en.wikipedia.org/w/index.php?title=Elasticsearch&oldid=635606114, pp. 1-4 (Nov. 27, 2014, Downloaded from the Internet Dec. 23, 2014).

(Continued)

*Primary Examiner* — Farhan Syed
(74) *Attorney, Agent, or Firm* — Jenkins, Wilson, Taylor & Hunt, P.A.

(57) ABSTRACT

Methods, systems, and computer readable mediums for performing a free-form query are disclosed. According to one exemplary embodiment, a method for performing a free-form query includes receiving free-form information for requesting information about a computing system, converting the free-form information into at least one compatible query for querying at least one data set, querying, using the at least one compatible query, the at least one data set for the information about the computing system, and providing the information about the computing system.

14 Claims, 6 Drawing Sheets

(56) References Cited

OTHER PUBLICATIONS

"ANTLR," Wikipedia, http://en.wikipedia.org/w/index.php?title=ANTLR&oldid=635516124, pp. 1-4 (Nov. 26, 2014, Downloaded from the Internet Dec. 23, 2014).

"Overview," http://www.elasticsearch.org/overview, pp. 1-6 (Copyright 2014).

"Open Source Distributed Real Time Search & Analytics," http://www.elasticsearch.org/, pp. 1-6 (Copyright 2014).

"What is ANTLR?," ANTLR, http://www.antlr.org/index.html, pp. 1-2 (Copyright 2014).

"About the ANTLR Parser Generator," ANTLR, http://www.antlr.org/about.html, p. 1 (Copyright 2014).

Commonly-assigned, co-pending U.S. Appl. No. 15/250,289 for "Methods, Systems, and Computer Readable Mediums for Performing an Aggregated Free-Form Query," (Unpublished, filed Aug. 29, 2016).

\* cited by examiner

CIS QUERY ENGINE – QUERY PAGE

202 — | find all CIS |   | SEARCH | — 204

Found 5, showing 0 to 5, show *next, previous, first few*

206

| ELEMENT TAG | CIS TAG | CIS NAME | HOST | STATUS | LOCATION |
|---|---|---|---|---|---|
| CIS | CIS-380 | HAL634 | T34.test.lab | Normal | Joy, TX |
| CIS | CIS-380 | HAL644 | T44.test.lab | OFFLINE | Joy, TX |
| CIS | CIS-390 | HAL635 | T35.test.lab | CRITICAL | Joy, TX |
| CIS | CIS-410 | DATACENTER6 | U36.live.net | MAJOR | Baja, FL |
| CIS | CIS-430 | DATACENTER7 | U37.live.net | DEGRADED | Baja, FL |

FIG. 2A

CIS QUERY ENGINE – QUERY PAGE

202 — *find storage volume in "Joy" with thin_provisioned="true"*  [SEARCH] — 204

206 — Found 145, showing 0 to 50, show *next, previous, first few*

| ELEMENT TAG | CIS TAG | VOLUME NAME | HOST | THIN_PROVISIONED | LOCATION |
|---|---|---|---|---|---|
| STORAGEVOLUME | CIS-380 | LUN 2 | T34.test.lab | TRUE | Joy, TX |
| STORAGEVOLUME | CIS-380 | LUN 3 | T34.test.lab | TRUE | Joy, TX |
| STORAGEVOLUME | CIS-390 | LUN 5 | T34.test.lab | TRUE | Joy, TX |
| STORAGEVOLUME | CIS-410 | LUN 7 | T34.test.lab | TRUE | Joy, TX |
| STORAGEVOLUME | CIS-430 | LUN 12 | T34.test.lab | TRUE | Joy, TX |

FIG. 2B

United States Patent US 10,037,368 B1

METHODS, SYSTEMS, AND COMPUTER READABLE MEDIUMS FOR PERFORMING A FREE-FORM QUERY

TECHNICAL FIELD

The subject matter described herein relates to query engines. More specifically, the subject matter relates to methods, systems, and computer readable mediums for performing a free-form query.

BACKGROUND

Management software can include user interfaces (UIs) and/or graphical user interfaces (GUIs) for managing, monitoring, viewing, and/or configuring one or more components (e.g., physical resources and/or virtual resources) within or associated with a computing system, e.g., a backend computing system separate from the management software. Such management software can include search functionality that allows a user to search for a specific element or entity in the computing system using specific criteria. However, such search functionality is generally inefficient, cumbersome, and error-prone.

SUMMARY

Methods, systems, and computer readable mediums for performing a free-form query are disclosed. According to one exemplary embodiment, a method for performing a free-form query includes receiving free-form information for requesting information about a computing system, converting the free-form information into at least one compatible query for querying at least one data set, querying, using the at least one compatible query, the at least one data set for the information about the computing system, and providing the information about the computing system.

BRIEF DESCRIPTION OF THE DRAWINGS

The subject matter described herein will now be explained with reference to the accompanying drawings of which:

FIGS. 2A-2C are diagrams illustrating an exemplary user interface for performing a free-form query according to an embodiment of the subject matter described herein;

DETAILED DESCRIPTION

Figure 1:
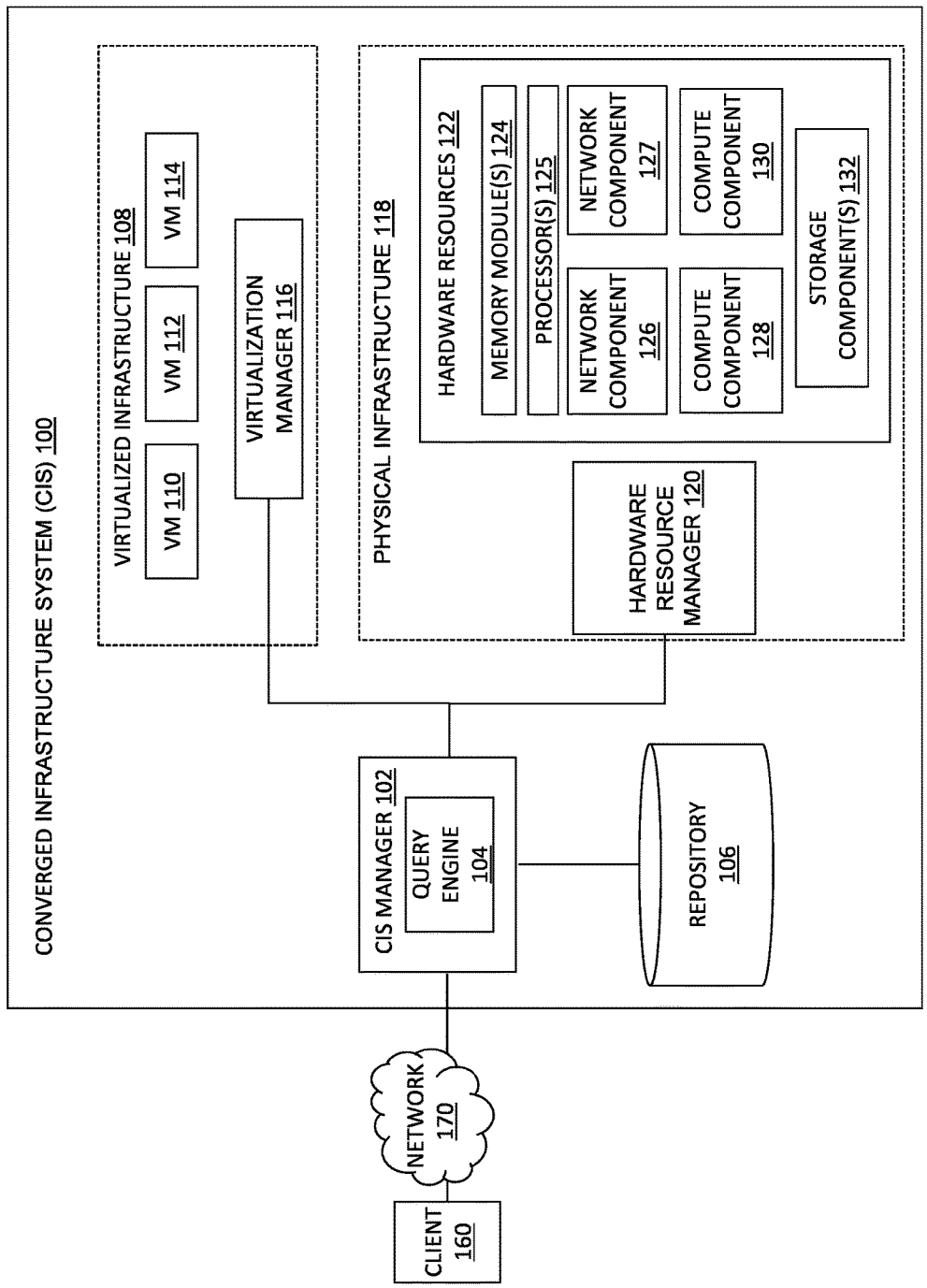
FIG. 1 is a diagram illustrating an exemplary converged infrastructure system according to an embodiment of the subject matter described herein.

The subject matter described herein includes methods, systems, and computer readable mediums for performing a free-form query. Some management software includes tools for discovering and managing computing systems. For example, management software can include a search tool for discovering a specific computing system component, such as element, physical resource, and/or virtual resource in a computer system or group of computing systems. However, conventional search tools generally require rigid input including specific commands, instructions, criteria, and related identifiers, which can require significant amounts of domain knowledge, experience, and/or research by a user to perform adequate searching.

Another issue involving conventional search tools is the use of static, predefined search interfaces for searching and/or refining a given search. For example, some management systems can use traditional, silo-based storage area network (SAN) tools based on form-driven narrow searches, spreadsheets, and manual processing by an operator for cross correlating and/or associating different data from various sources. As such, users must generally spend significant time and/or resources to search for needed information and/or to solve a specific issue using conventional search tools. Moreover, issues can be acerbated when the number of systems, CSCs, and/or networks increase and/or where systems and/or networks are located in different places, e.g., in different rooms, states, and/or countries.

In accordance with some aspects of the disclosed subject matter, functionality for performing a free-form query can involve interacting with one or more converged infrastructure system (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although the following disclosure describes the use of one or more CISs, any integrated infrastructure system or device can be utilized without departing from the scope of the present subject matter.

In accordance with some aspects of the disclosed subject matter, a computing platform (e.g., a node or device) or module (e.g., firmware, hardware, and/or software executing on a processor) can include functionality for performing a free-form query involving one or more data sets. For example, data sets can include various data structures, e.g., a management information base (MIB), a graph database, a datastore, and/or other databases, managed by one or more data management systems. In this example, a query engine in accordance with aspects of the disclosed subject matter can analyze and/or convert the free-form query into one or more appropriate query formats for querying relevant data sets.

In accordance with some aspects of the disclosed subject matter, functionality for performing a free-form query can provide relevant query results quickly, e.g., at or near real-time. For example, a query engine in accordance with aspects of the disclosed subject matter can be configured to quickly and efficiently query relevant data sets and to obtain and/or derive related information (e.g., contextually relevant) associated with the query. In this example, the related information can be stored in a graph database and may be determined by identifying relationships between two or more data elements in the graph database.

Advantageously, some aspects of the disclosed subject matter can allow a user to quickly and efficiently query one or more computing systems and/or CSCs therein without requiring the user to know or learn a large amount of domain knowledge (e.g., knowledge about data sets containing requested information and/or related data management systems). For example, rather than present a rigid and overwhelming list of pre-defined lists or menus, a query engine in accordance with aspects of the disclosed subject matter can allow a user to initiate a query with a simple phrase and further elaborate on that phrase to narrow the query via a natural progression of discovery and interaction.

Further, by providing real-time or near real-time results that include contextually relevant information, some aspects of the disclosed subject matter can provide relevant information associated with a query that increases user productivity and/or efficiency. For example, rather than simply providing results that solely includes queried information, a query engine in accordance with aspects of the disclosed subject matter can be configured to obtain or derive contextually relevant information, such as performance indicators and aggregations of those indicators, associated with the queried information. In another example, a query engine in accordance with aspects of the disclosed subject matter can be configured to obtain information that is logically or physically associated with queried information in addition to the queried information.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computer system can be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, CIS 100 can be configured to provide data management functionality, cloud service functionality, and/or other functionality. CIS 100 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CIS 100, CSCs therein, and/or other entities. In some embodiments, client 160 can communicate directly with CIS 100 with or without using network 170.

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 can be configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can include a converged infrastructure management application for interacting with CIS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for inputting information for performing a free-form query and/or for displaying query results associated with the free-form query.

CIS manager 102 can comprise or interact with a query engine 104. Query engine 104 can be any suitable entity (e.g., hardware, firmware, and/or software executing on a processor) for performing one or more aspects associated with performing a free-form query. For example, query engine 104 can be configured to receive input (e.g., a natural language query or command) from a user for requesting information about CIS or a CSC therein, to convert or transform the user input into at least one compatible query for requesting information from at least one data set, and to provide results associated with the query to the user.

In some embodiments, query engine 104 can include functionality for receiving, analyzing, and/or processing free-form (e.g., natural language and/or semi-natural language) queries. For example, if a user (e.g., at client 160) is looking to provision storage for a large number of workloads, the user may need to determine which CIS has capacity to handle the workloads, e.g., among a group of CISs that the user manages. In this example, a free-form query, such as "find storage in Raleigh, N.C. with remaining capacity greater than 80%", can be usable to quickly request an appropriate CIS in a particular location without any knowledge of how or where the requested information is stored. Continuing with the example, query engine 104 can use the free-form query to provide results usable for performing the provisioning operation.

In some embodiments, query engine 104 can include or utilize one or more communications interfaces, e.g., a GUI, a CLI, an API, or other interface, for receiving and sending query related information (e.g., queries, query results, and/or other information). For example, a user can request, using a representation state transfer (REST) API related message, information about a particular CIS or CSC therein using a free-form query. In this example, query engine 104 can provide, using a REST API related message, query results associated with the free-form query. In another example, user may input a free-form query using web-based interface, such as a web page, a file (e.g., an XML file), or other interface. In yet another example, an application (e.g., a third-party management application) may interact with query engine 104 for requesting information about a particular CIS or CSC by providing free-form information, e.g., via an API or other interface.

In some embodiments, query engine 104 can include functionality for processing a free-form query and for interpreting information in the free-form query so as to identify information usable for generating non-free-form (e.g., machine understandable) queries. For example, query engine 104 can include a processing engine (e.g., a parser, a grammar-driven analyzer, and/or software, like ANother Tool for Language Recognition (ANTLR), executing on a processor) for performing grammar processing associated with a free-form query. In this example, query engine 104 can process the free-form query by performing a lexical and/or structural (e.g., syntactical) interpretation such that the interpretation becomes unambiguous, yet tolerant of natural language sentence structure, e.g., by accepting, yet disregarding or ignoring, certain words, such as "the", "with", "for", etc.

In some embodiments, query engine 104 or an entity therein can generate an abstract syntax tree (AST), also referred to herein as a phrasing tree, associated with a free-form query. For example, a free-form query (e.g., a natural language query) can include various combinations of analytical, geospatial, and/or categorical phrasings (e.g., query related commands, instructions, and/or criteria). In this example, query engine 104 can convert the free-form query into a phrasing tree that stands independent of any particular grammar specification, data set, or data management system. Continuing with this example, query engine 104 can use the phrasing tree for generating non-free-form (e.g., machine-readable or machine-actionable) queries, such as a structured query language (SQL) query, a NoSQL query, an extensible markup language (XML)-based query, a proprietary query, or another query, usable for interacting with one or more data management systems and/or for querying one or more data sets.

In some embodiments, query engine 104 or an entity therein can generate one or more non-free-form queries associated with a free-form query. For example, query engine 104 can be configured to generate, using a phrasing tree, queries that are compatible with one or more data management system and can use the generated queries for obtaining query results and/or related information. In this example, query engine 104 can be configured to generate the query based on preconfigured query generation rules associated with a relevant phrasing tree, data set, or data management system. In another example, query engine 104 can be configured to generate a query based on information (e.g., hints) from a user or other entity, e.g., a network operator, a network management system, and/or repository 106. In yet another example, query engine 104 can be configured to generate, using information from a phrasing tree, a query based on various techniques, such as artificial intelligence (e.g., logic that changes based on experiences and/or context), trial-and-error, and/or historical information (e.g., previous valid, compatible queries).

In some embodiments, query engine 104 can include functionality for performing query processing and/or analyses associated with a phrasing tree. For example, after generating a phrasing tree associated with a free-form query, query engine 104 can perform a query analysis for determining what type and how many non-free-form queries are needed for satisfying (e.g., answering) a free-form query. In another example, query engine 104 can perform a query analysis for obtaining or gathering additional information (e.g., relational information) such that one or more non-free-form queries can be generated. In this example, obtaining or gathering additional information can include requesting the additional information from a user and/or generating supplemental queries for obtaining the additional information.

Exemplary types of non-free-form queries can include a flat query and a relational query. A flat query can include a query for querying a single data set and can provide a result set including data values in a tabular or semi-structured format. For example, an exemplary flat SQL query can be "Select Name from Employee_Table", where a result set can include a list of names stored in a table named "Employee Table". A relational query can include a query that results in querying multiple tables or data sets and can require relational information to obtain accurate results. For example, an exemplary relational SQL query can be "Select Employee_Table.Name, Wage_Table.Amount from Employee_Table, Wage_Table where Employee_Table.EmpolyeeID=Wage_Table.EmpolyeeID. In this example, the where portion of the SQL query includes relational information (e.g., an employee identifier) that links information associated with the same person in two tables, Employee_Table and Wage_Table.

In some embodiments, query engine 104 can include functionality for querying, traversing, and/or utilizing an unstructured or semi-structured data structure. For example, query engine 104 can include a processing engine (e.g., a data set management system and/or Elasticsearch software executing on a processor) for receiving a query or other information and using the information to query an unstructured data structure, such as a JavaScript object notation (JSON) document or a semi-structured data object, for obtaining and/or deriving relevant query results.

In some embodiments, a query can be constructed or generated by identifying an information domain (e.g., scope, table, etc.) and one or more constraints (e.g., filters, ranges, locations, etc.) using information from a phrasing tree and translating that into a compatible query for querying a particular data set. For example, query engine 104 can implement or utilize an unstructured data set, where elements (e.g., tables, entities, information, etc.) of a domain are stored as semi-structured data objects (e.g., JSON documents). In this example, the content to be queried, which is inserted into and managed by the data set management system, can be a series of distinct documents that correspond to either a physical or logical element in the solution domain and can be composed of informational, categorical, and numerical fields. Continuing with the example, query engine 104 can use a compatible query for obtaining information from the semi-structured data objects.

In some embodiments, query engine 104 can include functionality for querying, traversing, and/or utilizing a graph related data structure. For example, query engine 104 can include a processing engine (e.g., a graph data set management system and/or graph database software (e.g., Titan) executing on a processor) for receiving a query or other information and using the information to query a graph related data structure, such as data elements stored in a graph database, for obtaining and/or deriving relevant query results.

In some embodiments, a graph related data structure can include data elements, edges, and properties for representing and/or storing data. In this example, each data element can represent a CSC, a computing system, CIS 100, or another entity and can include associated properties or attributes. Continuing with this example, relationships between the data elements can be represented as connections or edges connecting the data elements.

In some embodiments, a query can be constructed or generated for obtaining or identifying relationships between data, data sets, or data objects. For example, query engine 104 can identify relationships between portions of free-form information and can use this information in generating a relational query and/or for traversing data elements and edges in a graph database. In this example, after identifying relevant relationships, a relational query can use the relationships and/or additional information for obtaining relevant information associated with the free-form information.

In some embodiments, query engine 104 or an entity therein can provide and/or present (e.g., to a user) contextually relevant information associated with a free-form query. For example, query engine 104 can request and obtain information that is not explicitly requested in a free-form query, such as performance indicators and aggregations of such indicators. In this example, query engine 104 can use a variety of factors (e.g., predetermined rules, artificial intelligence, historical information, and/or user preferences) for determining which, if any, additional information should be queried—for and provided to a user. In some embodiments, query engine 104 can be configured to query one or more data sets and/or use (e.g., traverse) a graph database to obtain, identify, or derive additional relevant information, e.g., information that is logically and/or physically associated with a queried entity.

In some embodiments, query engine 104 can find, determine, and/or provide one or more computing systems, CISs, and/or CSCs therein that meet query criteria and, optionally, can rate and/or rank the computing systems, CISs, and/or CSCs therein that meet query criteria based on one or more factors. For example, a user can trigger query engine 104 to "find five computing systems for performing service X" via a user interface. In this example, results obtained by query engine 104 can include the top five rated computing systems or related system identifiers that meet the requested criteria, where the computing systems may be rated using a performance indicator and/or a health indicator, such as a status indicator. In another example, a user can trigger query engine 104 to "find a storage component for storing streaming video" via a user interface. In this example, results obtained by query engine 104 can include the top rated storage component (e.g., under an operator's administration) that meets the requested criteria, where the rating is based on relevant factors, such as access speed of storage component, free space available at storage component, and/or utilization of storage component.

In some embodiments, query engine 104 can find, determine, and/or provide status information associated with one or more computing systems, CISs, and/or CSCs therein. For example, a user can trigger query engine 104 to "find any offline CIS", "find status of all processing components in CIS X", or "find all congested computing systems in Joy, Tex." via a user interface. In this example, results obtained by query engine 104 can include relevant information associated with entities that meet the query criteria, including, for example, a performance indicator, a congestion indicator, and/or a health indicator, such as a status indicator or a usability indicator.

In some embodiments, query engine 104 or an entity therein can generate, store, and/or utilize result processing rules and/or other information for processing query related information (e.g., query results) obtained or gathered. For example, result processing rules associated with one or more data elements (e.g., JSON documents) or information therein (e.g., informational, categorical, and numerical fields) can be pre-defined in the system. In this example, one result processing rule can include performing an aggregation or summation of a particular field associated with a query result, e.g., by computing a minimum, an average, and/or a maximum of values of that field. In some embodiments, information obtained or derived using results processing rules can be incorporated into a final result set that can be provided to the user or another entity.

In some embodiments, query related information can be stored in repository 106. Repository 106 can include any data storage unit (e.g., a database or plurality of databases) that can be configured to store query related information, such as query instructions, query commands, query criteria, phrasing trees or related data structures, query generation rules, parsing rules, and/or historical information. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 can be implemented using one or more computing platforms, devices, or systems.

In some embodiments, repository 106 can be provisioned with query related information from a second repository (e.g., from a second CIS or from an online location, such as a known, online site that can be hosted by the CIS manufacturer). For example, query related information can be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS can be located at a common site and can be communicatively connected by a wired connection. In such a configuration, repository 106 can be provisioned with query related information from the second CIS via the wired connection. It is understood that the provisioning of repository 106 with query related information using the exemplary methods described above can be conducted via any automated or automatic manner. In addition, query related information copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 can be communicatively connected to various other CSCs in CIS 100 and other entities. Hardware resources 122 can be configured for use by one or more virtual entities. In some embodiments, network components 126-127 (e.g., network switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, storage component(s) 132 can include any storage medium or storage unit that is configured to store information accessible by processor(s) 125 via a system bus. In some embodiments, repository 106 or portions thereof can utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a query engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, query engine 104 can comprise multiple, interacting processing engines, e.g., one engine for UI interaction, one engine for parsing, one engine for unstructured data set retrieval and management, and one engine for graph related data structure retrieval and management. Further, aspects of the disclosed subject matter (e.g., query engine 104) can be implemented and/or located on any computing system or components therein.

Figure 2C:
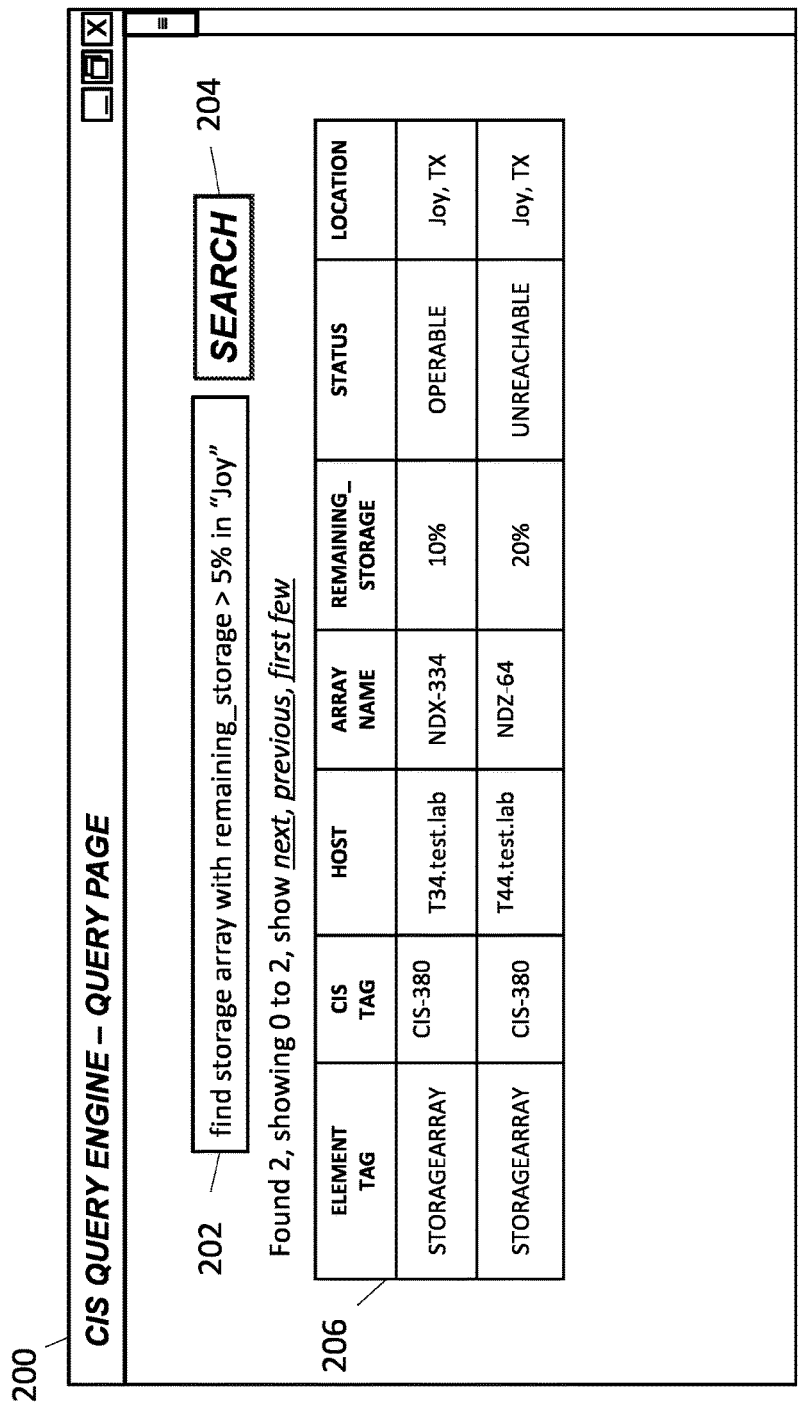

FIGS. 2A-2C are diagrams illustrating an exemplary user interface 200 for performing a free-form query according to an embodiment of the subject matter described herein. As stated above, conventional search tools require that a user know and use numerous, proprietary query formats and/or navigate a rigid and potential overwhelming list of pre-defined query components (e.g., lists of criteria names, commands, and/or related instructions). For example, a user can want to find disks allocated to a particular virtual machine where they have included their user ID within the name of that virtual machine. In order to obtain the virtual machine, the related disks, and a summation of the capacity of those disks using an extremely simplified solution data model, the following series of pseudo-SQL queries would be needed:

SET vm:=SELECT id FROM virtual_machine WHERE name LIKE "% userid1%"; SET vol:=SELECT volume_id FROM volume_to_virtual_machine WHERE vm_id in $vm$; SET disk:=SELECT disk_id FROM disk_to; Return results of: SELECT*FROM virtual_machine WHERE id in $vm$; Return results of: SELECT*from volume WHERE id in $vol$; Return results of SELECT MIN(capacity), AVG (capacity), MAX(capacity) FROM disk where id in $disk} GROUP BY id.

In contrast to conventional search tools, some aspects of the disclosed subject matter can utilize a freeform (e.g., plain English) query for querying a vast set of semi-structured content and for obtaining real-time or near-real-time results including contextually relevant information. Moreover, some aspects of the disclosed subject matter can allow a user to initiate a query with a simple (e.g., free-form) phrase and to further elaborate on that phrase for narrowing the query via a natural progression of discovery and interaction.

In some embodiments, query engine 104, CIS manager 102, a converged infrastructure management application, and/or an associated module or node can generate and/or provide user interface 200 for providing, receiving, and/or displaying query related information. In some embodiments, user interface 200 can be presented to a user via a web browser executing on a processor at client 160.

User interface 200 can represent any suitable UI element container or UI window for displaying or providing content to a user. In some embodiments, user interface 200 can include UI elements for providing query criteria and/or for querying data sets for relevant information. For example, a user can utilize user interface 200 for identifying a subset of CSCs in CIS 100 based on one or more user-defined and/or predefined criteria, e.g., manufacturer, type, availability, location, and/or other criteria. In another example, a user can utilize user interface 200 for generating a compliance report based on one or more user-defined and/or predefined criteria.

Referring to FIGS. 2A-2C, user interface 200 can include a query input box 202, a query button 204, and a results container 206. Query input box 202 can represent any suitable UI element for receiving user input. For example, a user can input a free-form query as a natural language question or command, such as "find all CIS", for requesting information associated with CIS 100 or a related environment. In this example, the free-form query can be written with little or no knowledge of the underlying data sets or data structures that contain the requested information.

Query button 204 can represent any suitable UI element for triggering a query. For example, after inputting text into query input box 202, a user can select or click query button 204. In this example, in response to selecting query button 204, the text in query input box 202 can be sent to query engine 104 for generating queries and obtaining relevant query results.

In some embodiments, query button 204 can trigger UI elements for gathering query related information. For example, a user can select query button 204 and a UI window can appear for allowing the user to clarify input in query text box 202 and/or to input additional information, such as a location criterion and/or authorization credentials. Continuing with the example, after inputting the query related information, the information can be provided to query engine 104 and query engine 104 can generate query results using the query related information and/or text from query input box 202.

Results container 206 can represent any suitable UI element for displaying one or more query results and/or results related information. For example, results container 206 can display results in a tabular or grid format, e.g., each result can be a separate row in a set of rows. In this example, requested information and/or related information can be displayed in results container 206. Continuing with the example, if a user selects a result (e.g., a result line or row) in results container 206, additional information can be presented to the user about the selected result.

In some embodiments, results container 206 can include or trigger UI elements for selecting, editing, adding, and/or deleting results or results related information. For example, a user can select a CSC displayed in results container 206 and a UI window can appear including UI elements for viewing, editing, or deleting the CSC.

In some embodiments, results or results related information in results container 206 can be sorted based on one or more factors. For example, results in results container 206 can be listed alphabetically, temporally (e.g., by an active date), and/or based on usage (e.g., results can be listed from most frequently selected to least frequently selected) or status (e.g., online CSCs then offline CSCs).

In some embodiments, results in results container 206 can include requested information (e.g., information that answers a free-form query) and/or other relevant (and possibly unrequested) information. In some embodiments, relevant information can be determined by using a graph database or other related data structure for finding adjacent elements that include information related to some requested information. For example, results container 206 can include contextually relevant information, such as performance indicators and aggregations of those indicators, and/or information that is logically or physically associated with a queried entity.

As depicted in FIG. 2A, a user can trigger query engine 104 to "find all CIS" via user interface 200. In this example, results obtained by query engine 104 can include a set of CIS identifiers, e.g., CIS tags. However, query engine 104 can also determine other relevant information to provide, such as an element tag associated with each CIS, a CIS name (e.g., a name, like 'HAL634' or 'DATACENTER6', associated with each CIS), a host identifier associated with each CIS, a status associated with each CIS, and/or a location associated with each CIS.

As depicted in FIG. 2B, a user can trigger query engine 104 to "find storage volume in 'Joy' with thin_provisioned='true'" via user interface 200. In this example, results obtained by query engine 104 can include a set of storage volume identifiers, e.g., volume names. However, query engine 104 can also determine other relevant information to provide, such as an element tag associated with each storage volume, a CIS tag associated with each storage volume, a host identifier associated with each storage volume, a 'thin_provisioned' attribute associated with each storage volume, and/or a location associated with each storage volume.

As depicted in FIG. 2C, a user can trigger query engine 104 to "find storage array with remaining_storage>5% in 'Joy'" via user interface 200. In this example, results obtained by query engine 104 can include a set of storage array identifiers, e.g., storage array names. However, query engine 104 can also determine other relevant information to provide, such as an element tag associated with each storage array, a CIS tag associated with each storage array, a host identifier associated with each storage array, a 'remaining_storage' attribute associated with each storage array, and/or a location associated with each storage array.

It will be appreciated that FIGS. 2A-2C are for illustrative purposes and that additional and/or different UI elements than those depicted in FIGS. 2A-2C can be usable for displaying and/or providing information associated with a free-form query.

Figure 3:
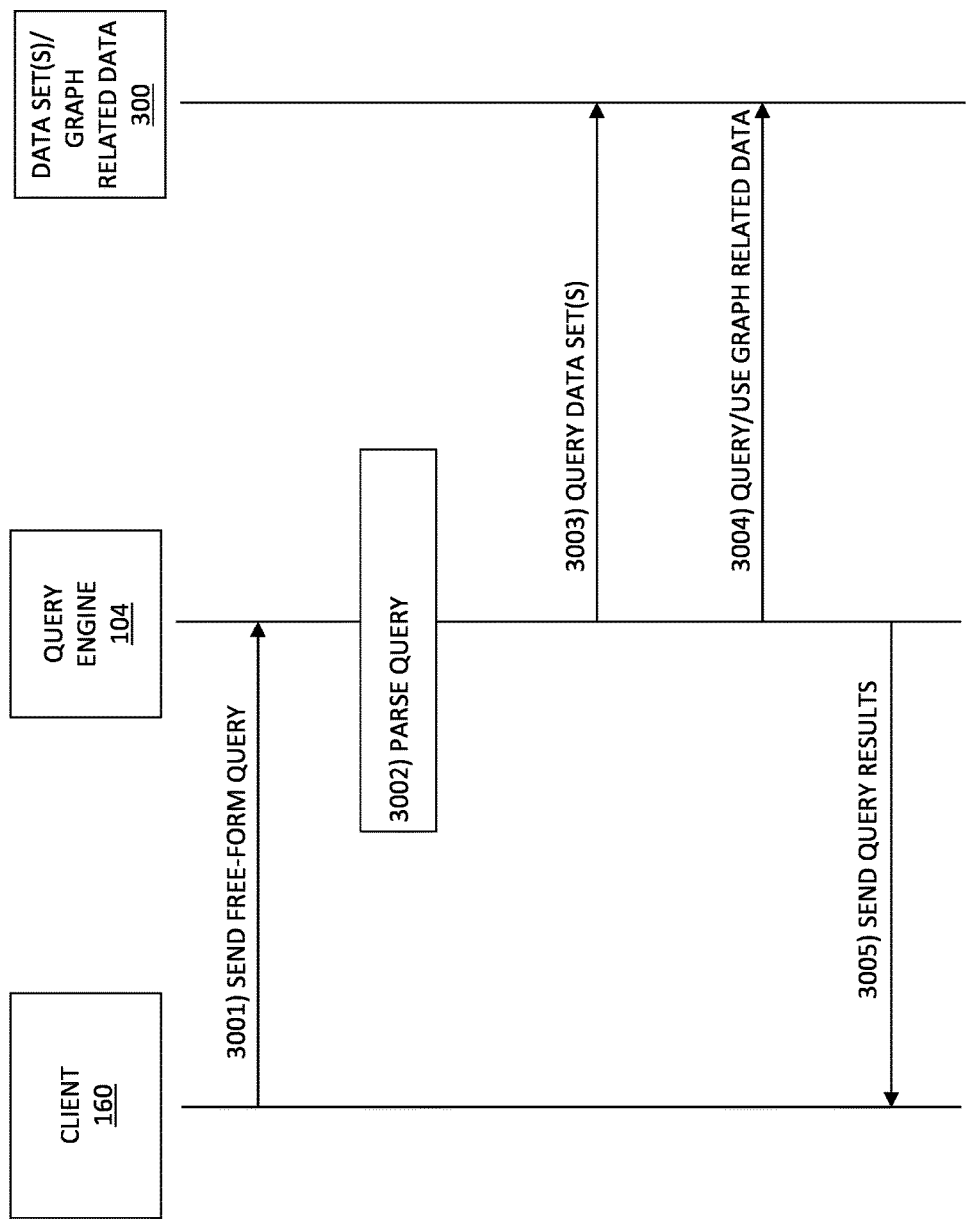
FIG. 3 is a diagram illustrating exemplary communications associated with performing a free-form query according to an embodiment of the subject matter described herein.

FIG. 3 is a diagram illustrating exemplary communications associated with performing a free-form query according to an embodiment of the subject matter described herein. In some embodiments, query engine 104 can be integrated with and/or can be located at CIS manager 102, e.g., server-side software executing on a processor at CIS 100. In some embodiments, query engine 104 can be integrated with and/or can be located at client 160, e.g., client-side software executing on a processor at client 160.

Referring to FIG. 3, at step 3001, a free-form query can be sent from client 160 to query engine 104. For example, a user can input a natural language query in query input box 202 of user interface 200 and select query button 204. In this example, user interface 200 and/or a related application or entity can send the natural language query via an HTTP message or other message.

At step 3002, the query can be parsed and/or analyzed. For example, a grammar or syntax parser (e.g., software executing on a processor) can analyze the query and generate a data structure (e.g., a phrasing tree) for storing a representation of the free-form query. In this example, the parser, query engine 104, and/or a related application can use the phrasing tree to generate one or more compatible queries for querying one or more data sets.

At step 3003, one or more datasets 300 can be queried using information associated with the free-form query. For example, after generating a phrasing tree, query engine 104 can generate a SQL query using the phrasing tree. In this example, query engine 104 can use the SQL query for obtaining information stored in a SQL-related database.

At step 3004, graph related data 300 can be queried and/or used. For example, query engine 104 can use a graph database for identifying a first data element associated with a free-form query. In this example, query engine 104 can use the graph database for obtaining contextually relevant information associated with the query by identifying and/or traversing adjacent data elements and/or edges associated with the first data element.

In some embodiments, query engine 104 can process (e.g., correlate and aggregate) various information obtained from one or more data sets and/or graph related data. For example, query engine 104 can aggregate values for a particular field by computing a minimum, an average, and/or a maximum of the values of the field. In this example, the aggregated value can be provided to the user along with other query related information (e.g., query results).

At step 3005, query results can be sent query engine 104 to client 160. For example, query results can be provided in an HTTP message or other message and can be displayed using user interface 200 and/or a web browser application.

It will be appreciated that FIG. 3 is for illustrative purposes and that additional and/or different steps than those depicted in FIG. 3 can be usable for performing a free-form query. Additionally, it will be appreciated that steps depicted in FIG. 3 can occur in a different order than depicted or can be combined. For example, step 3004 can occur prior to or concurrently with step 3003.

Figure 4:
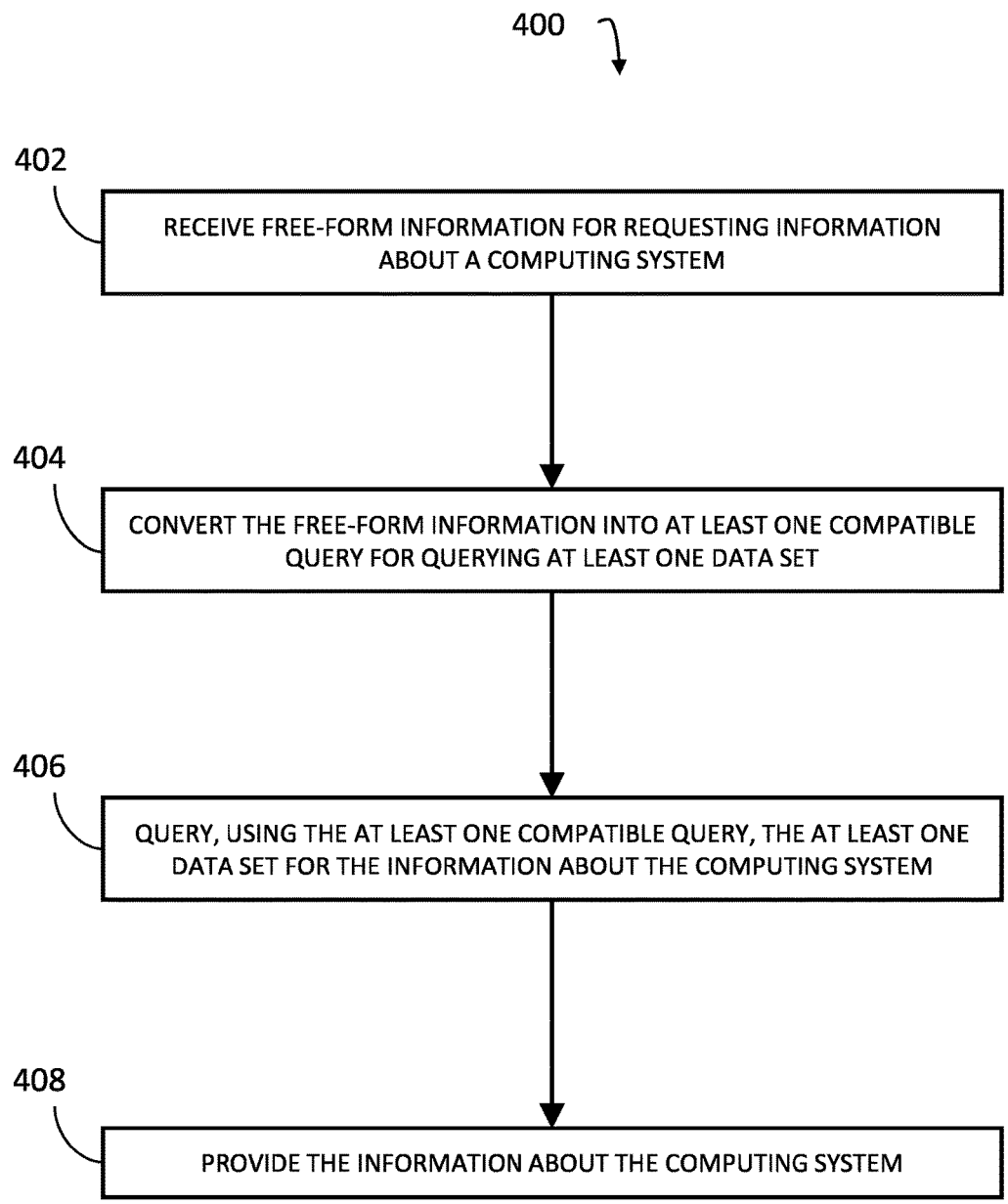
FIG. 4 is a diagram illustrating an exemplary method for performing a free-form query according to an embodiment of the subject matter described herein.

FIG. 4 is a diagram illustrating an exemplary method 400 for performing a free-form query according to an embodiment of the subject matter described herein. In some embodiments, exemplary method 400 and/or steps therein can be performed by CIS 100, query engine 104, and/or another node (e.g., a computing platform containing one or more processors and memory) or module. For illustrative purposes and explanation, references to entities included in FIGS. 1-3 can be used below.

At step 402, free-form information for requesting information about a computing system is received. For example, free-form information may be a single, self-standing query string and/or may be stored in a query message. In another example, free form information may be stored as in an XML file or other file.

In some embodiments, free-form information may include a natural language or semi-natural language query.

At step 404, the free-form information is converted into at least one compatible query for querying at least one data set. For example, query engine 104 can convert free-form information (e.g., a natural language command) into a compatible (e.g., a data set native) query (e.g., an XML-based query or a SQL query) for querying a database or other data structure.

In some embodiments, converting free-form information into at least one compatible query can include generating (e.g., using a parser or query engine 104) a data structure (e.g., an AST or a phrasing tree) for representing the free-form information and can include generating, using the data structure, the at least one compatible query that is understandable by a data management system managing at least one data set.

In some embodiments, query engine 104 or a related entity (e.g., a parser) can generate a compatible query (e.g., an SQL query) using a phrasing tree and one or more query generation rules associated with the at least one data set.

At step 406, the at least one data set is queried, using the at least one compatible query, for the information about the computing system. For example, query engine 104 can access a management information base (MIB) associated with one or more CSCs in CIS 100 and can use free-form information (e.g., a natural language query) that has been converted or formatted to be compatible with querying the MIB.

In some embodiments, querying, using free-form information, at least one data set for the information about CIS 100 can include utilizing a graph related data structure for obtaining at least one member selected from a group consisting of the information about the CIS and contextually relevant information associated with the information about the CIS.

In some embodiments, contextually relevant information can include at least one member selected from a group consisting of statistics based on queried information, a maximum of a set of values, a minimum of a set of values, an average of a set of values, an aggregation of a set of values, a derived value using information from one or more sources, and information stored in at least one adjacent element to an element storing the information about the computing system in the graph related data structure.

In some embodiments, at least one data set and a graph related data structure can be associated with one or more data management systems. For example, an element management system (EMS) can manage a database for one or more CSCs associated with CIS 100 and CIS manager 102 can manage a graph related data structure (e.g., a graph database) and one or more data sets containing information about CIS 100 or CSCs therein.

At step 408, the information about the computing system is provided. For example, results in the form of a table or grid can be provided in results container 206 of user interface 200.

In some embodiments, information about CIS 100 can include information about at least one member selected from a group consisting of a computing platform, a computing device, a virtual machine, a hypervisor, a compute component, a network component, a storage component, software, an operating system, firmware, hardware, a physical resource, and/or a virtual resource.

It should be noted that query engine 104 and/or functionality described herein can constitute a special purpose computing system. Further, query engine 104 and/or functionality described herein can improve the technological field of query engines (e.g., query engines involving diverse data sets managed by multiple entities) by allowing free-form (e.g., natural language) queries for obtaining information about one or more computing systems, CISs, and/or CSCs therein.

Query engine 104 and/or functionality described herein can improve the functionality of UI-assisted queries, UI navigation, and UIs in general by providing relevant and/or contextually aware information associated with a query, thereby providing more efficient and useful query results and minimizing redundant and/or additional queries. It should also be noted that a computing platform that implements the subject matter described herein can comprise a special purpose computing device usable to perform a free-form query for obtaining information about one or more computing systems, CISs, and/or CSCs therein.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing a free-form query, the method comprising:
    at a query engine implemented using at least one hardware-based processor:
        receiving, by the at least one hardware-based processor of the query engine, free-form information for requesting information about a computing system;
        converting, by the at least one hardware-based processor of the query engine, the free-form information into at least one compatible query for querying at least one data set, wherein converting the free-form information includes generating a parsing tree representing the free-form information and generating, using the parsing tree, the at least one compatible query that is understandable by at least a first data management system managing the at least one data set, wherein the at least one compatible query includes a management information base (MIB) query for querying a MIB;
        querying, by the at least one hardware-based processor of the query engine and using the at least one compatible query, the at least one data set for the information about the computing system, wherein querying, using the at least one compatible query, the at least one data set for the information about the computing system includes querying a graph related data structure for obtaining the information about the computer system including contextually relevant information associated with the information about the computing system, wherein the graph related data structure includes a first data element representing the computing system and at least a second data element representing at least one computing system component (CSC) associated with the computing system, wherein relationships between the data elements are represented in the graph related data structure as edges connecting the data elements, wherein obtaining the contextually relevant information includes identifying, by querying the graph related data structure, adjacent data elements or edges associated with the first data element, wherein one adjacent data element to the first data element is based on information obtained from the first data management system and a different adjacent data element to the first data element is based on information obtained from a second data management system; and
        providing, by the at least one hardware-based processor of the query engine, the information about the computing system to a user via a user interface.

2. The method of claim 1 wherein the free-form information includes a natural language or semi-natural language query.

3. The method of claim 1 wherein the contextually relevant information includes at least one member selected from a group consisting of statistics based on the information about the computing system, a maximum of a set of values, a minimum of a set of values, an average of a set of values, an aggregation of a set of values, a derived value using information from one or more sources, and information stored in at least one adjacent element to an element storing the information about the computing system in the graph related data structure.

4. The method of claim 1 wherein the at least one data set and the graph related data structure are associated with one or more data management systems.

5. The method of claim 1 wherein the information about the computing system includes information about at least one member selected from a group consisting of a computing platform, a computing device, a converged infrastructure system, a virtual machine, a hypervisor, a compute component, a network component, a storage component, software, an operating system, firmware, hardware, a physical resource, and a virtual resource.

6. A system for performing a free-form query, the system comprising:
    a processor; and
    a query engine implemented using the processor, wherein the query engine is configured to receive free-form information for requesting information about a computing system, to convert the free-form information into at least one compatible query for querying at least one data set, to query, using the at least one compatible query, the at least one data set for the information about the computing system, wherein converting the free-form information includes generating a parsing tree representing the free-form information and generating, using the parsing tree, the at least one compatible query that is understandable by at least a first data management system managing the at least one data set, wherein the at least one compatible query includes a management information base (MIB) query for querying a MIB, wherein the query engine is configured to query a graph related data structure for obtaining the information about the computer system including contextually relevant information associated with the information about the computing system, wherein the graph related data structure includes a first data element representing the computing system and at least a second data element representing at least one computing system component (CSC) associated with the computing system, wherein relationships between the data elements are represented in the graph related data structure as edges connecting the data elements, wherein obtaining the contextually relevant information includes identifying, by querying the graph related data structure, adjacent data elements or edges associated with the first data element, wherein one adjacent data element to the first data element is based on information obtained from the first data management system and a different adjacent data element to the first data element is based on information obtained from a second data management system, and to provide the information about the computing system to a user via a user interface.

7. The system of claim 6 wherein the free-form information includes a natural language or semi-natural language query.

8. The system of claim 6 wherein the contextually relevant information includes at least one member selected from a group consisting of statistics based on the information about the computing system, a maximum of a set of values, a minimum of a set of values, an average of a set of values, an aggregation of a set of values, a derived value using information from one or more sources, and information stored in at least one adjacent element to an element storing the information about the computing system in the graph related data structure.

9. The system of claim 6 wherein the at least one data set and the graph related data structure are associated with one or more data management systems.

10. The system of claim 6 wherein the information about the computing system includes information about at least one member selected from a group consisting of a computing platform, a computing device, a converged infrastructure system, a virtual machine, a hypervisor, a compute component, a network component, a storage component, software, an operating system, firmware, hardware, a physical resource, and a virtual resource.

11. A non-transitory computer readable medium having stored thereon executable instructions which, when executed by a processor of a computer, cause the computer to perform steps comprising:

receiving free-form information for requesting information about a computing system;

converting the free-form information into at least one compatible query for querying at least one data set, wherein converting the free-form information includes generating a parsing tree representing the free-form information and generating, using the parsing tree, the at least one compatible query that is understandable by at least a first data management system managing the at least one data set, wherein the at least one compatible query includes a management information base (MIB) query for querying a MIB;

querying, using the at least one compatible query, the at least one data set for the information about the computing system, wherein querying, using the at least one compatible query, the at least one data set for the information about the computing system includes querying a graph related data structure for obtaining the information about the computer system including contextually relevant information associated with the information about the computing system, wherein the graph related data structure includes a first data element representing the computing system and at least a second data element representing at least one computing system component (CSC) associated with the computing system, wherein relationships between the data elements are represented in the graph related data structure as edges connecting the data elements, wherein obtaining the contextually relevant information includes identifying, by querying the graph related data structure, adjacent data elements or edges associated with the first data element, wherein one adjacent data element to the first data element is based on information obtained from the first data management system and a different adjacent data element to the first data element is based on information obtained from a second data management system; and providing the information about the computing system to a user via a user interface.

12. The non-transitory computer readable medium of claim 11 wherein the free-form information includes a natural language or semi-natural language query.

13. The non-transitory computer readable medium of claim 11 wherein the contextually relevant information includes at least one member selected from a group consisting of statistics based on the information about the computing system, a maximum of a set of values, a minimum of a set of values, an average of a set of values, an aggregation of a set of values, a derived value using information from one or more sources, and information stored in at least one adjacent element to an element storing the information about the computing system in the graph related data structure.

14. The non-transitory computer readable medium of claim 11 wherein the at least one data set and the graph related data structure are associated with one or more data management systems.

\* \* \* \* \*